Aug. 28, 1956 H. L. BLOOD Re. 24,202

INTERNAL GRINDING MACHINE AND METHOD

Original Filed Aug. 16, 1951 10 Sheets-Sheet 1

Inventor
Harold L. Blood

By Dike & Sanborn

Attorneys

INTERNAL GRINDING MACHINE AND METHOD
Original Filed Aug. 16, 1951 10 Sheets-Sheet 2
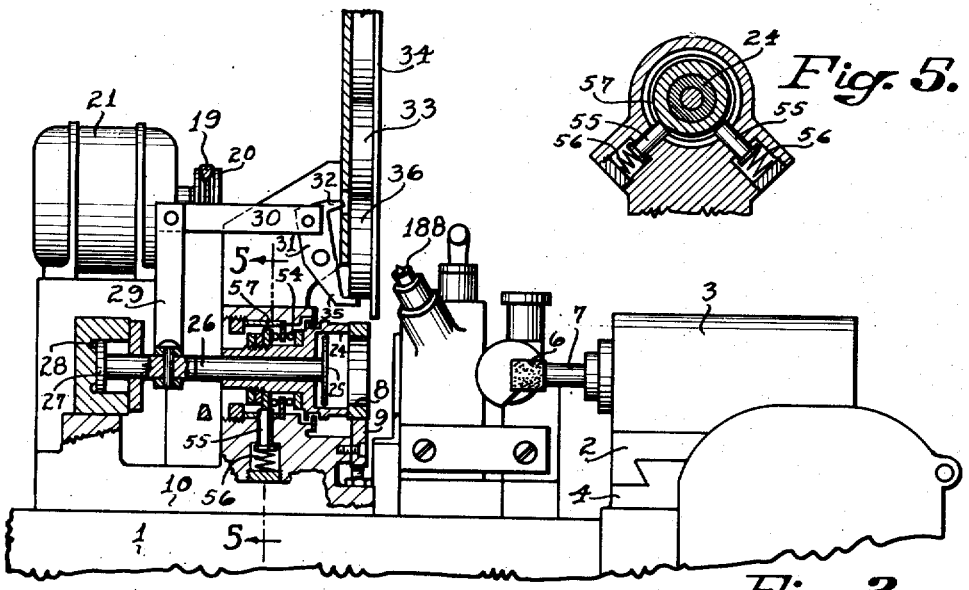
Fig. 2.
Fig. 5.
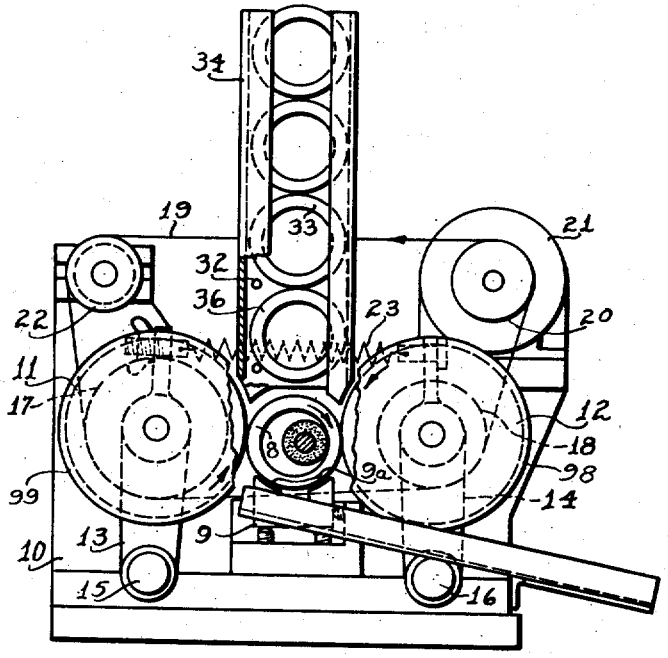
Fig. 3.
Inventor
Harold L. Blood
By Dike & Sanborn
Attorneys

INTERNAL GRINDING MACHINE AND METHOD

Original Filed Aug. 16, 1951 10 Sheets-Sheet 3

Inventor
Harold L. Blood

By Dike & Sanborn

Attorneys

INTERNAL GRINDING MACHINE AND METHOD

Original Filed Aug. 16, 1951 10 Sheets-Sheet 4

Inventor
Harold L. Blood
By Dike & Sanborn
Attorneys

INTERNAL GRINDING MACHINE AND METHOD

Original Filed Aug. 16, 1951 10 Sheets-Sheet 5

Inventor
Harold L. Blood

By Dike & Sanborn

Attorneys

INTERNAL GRINDING MACHINE AND METHOD

Original Filed Aug. 16, 1951 10 Sheets-Sheet 6

Inventor
Harold L. Blood
By Dike & Sanborn
Attorneys

INTERNAL GRINDING MACHINE AND METHOD

Original Filed Aug. 16, 1951 10 Sheets-Sheet 7

Inventor
Harold L. Blood
By Dike & Sauborn
Attorneys

INTERNAL GRINDING MACHINE AND METHOD

Original Filed Aug. 16, 1951 10 Sheets-Sheet 8

Inventor
Harold L. Blood
By Dike + Sanborn
Attorneys

INTERNAL GRINDING MACHINE AND METHOD

Original Filed Aug. 16, 1951 10 Sheets-Sheet 9

Inventor
Harold L. Blood
By Dike & Saubom
Attorneys

INVENTOR
HAROLD L. BLOOD
BY Dike, Thompson & Sanborn
ATT'YS

United States Patent Office

Re. 24,202

Reissued Aug. 28, 1956

24,202

INTERNAL GRINDING MACHINE AND METHOD

Harold L. Blood, Worcester, Mass., assignor, by mesne assignments, to The Heald Machine Company, a corporation of Delaware Original No. 2,646,652, dated July 28, 1953, Serial No. 242,102, August 16, 1951. Application for reissue February 24, 1954, Serial No. 412,407

41 Claims. (Cl. 51—103)

Matter enclosed in heavy brackets [ ] appears in the original patent but forms no part of this reissue specification; matter printed in italics indicates the additions made by reissue.

This invention relates to internal grinding machines of the centerless or chuckless type, in which workpieces are guided by their preformed outer surfaces of revolution while being rotated, and a rotating wheel or tool is applied to refine internal surfaces of revolution in the workpieces.

One difficulty with such machines is that in practice, some irregularities produced by previous operations are present on the outer guide surface of a workpiece and these irregularities adversely affect the accuracy of the inner finished surface being generated, and are reproduced, at least in part, in the inner surface.

Internal grinding machines have been constructed in which an annular workpiece is held against an end stop by one or more skewed rolls applied to a preformed outer surface of the work and rotated in contact with a stationary support. Such a machine is described in Patent No. 2,032,269 to Einstein et al. However, in the Einstein et al. patent the work is held in contact with a fixed roll and the line contact between the convex surface of the roll and the convex surface of the work cannot bridge irregularities in the outer surface of the work. These irregularities will, therefore, be reproduced, at least in part, in the inner surface being ground. Further, differences in the outer diameters of successive workpieces will affect the diameter of the inner surface. The Einstein et al. patent shows the work held against a stationary end stop and I have found it difficult to rotate the work smoothly when using this principle. All these difficulties are avoided in the present invention.

As a part of the present invention, the effect on the inner surface of irregularities in the outer surface is minimized by holding this outer surface against a stationary concave shoe or support surface which substantially conforms with the outer surface and extends circumferentially in contact therewith sufficiently to bridge irregularities therein and to fix the center of rotation of the rotating workpiece.

It is highly desirable to locate this support surface, with respect to the line of contact between tool and work, so that variations in the outer diameters of successive workpieces will have a comparatively small effect on the diameters of their inner surfaces. Otherwise, the manufacturing tolerance on the outer diameter would add to the variations in inner diameter which would be produced by the finishing operation.

As another feature of the invention, the support surface is, therefore, so located that the centers of workpieces having different outer diameters fall in a line substantially at right angles to the direction of radial feed motion of the wheel. The support surface extends approximately the same distance on either side of a line through the center of the work normal to a line through the centers of the work and tool. With this arrangement, two or more workpieces may be finished simultaneously by the same tool to the same inner diameter within a close tolerance.

If the support surface is located below the work and the tool is fed horizontally, the wheel tends to lift the work out of the support. This lifting must be prevented, but it is also desirable at the same time to prevent high friction between the work and support. It would otherwise be difficult to rotate the work by friction means, and excessive wear of the support would occur. The present invention includes means for holding the work against the support without excessive friction.

It would be practicable to rotate the work in the support by pressing a face of the work against a back plate rotating on a fixed axis, and it has been customary to locate such a plate eccentric with respect to the work, in a direction which insures against lifting the work away from the support. But an eccentric driving plate has the disadvantage of increasing the friction between work and support and increasing the wear on both the support and the plate. The present invention includes end stop means comprising a back plate which is free to rotate on an axis determined by the work, and which fixes the plane of the face of the work accurately. Since there is no slippage between the plate and the work, the coefficient of friction between the plate and work is high, it being well known that the friction of rest is ordinarily higher than the friction of motion.

The high coefficient of friction means that a comparatively small force is sufficient to hold the work against the rotating plate and thereby to rotate the work. The present invention, therefore, makes it possible, instead of applying an axial force against one face of the work, to press a pair of skewed rolls against the periphery of the work at nearly opposite points and in this way to develop sufficient axial force. Such an arrangement permits the wheelhead to be brought close to the work, since there need be no intervening parts. The length of the wheel spindle may thus be reduced to a minimum, which is often a great advantage in internal grinding.

When rolls are pressed against the periphery of the work it is essential that they do not disturb the work in the support. Means are, therefore, provided to insure that equal force is exerted upon the work by opposite rolls.

The same pressure means may be used both to hold the work against both the work support means and the back plate or other end stop means. It is important to note, however, that such pressure means are not fixed and do not in themselves locate the work but rather serve to urge the work against the work locating means.

It is also important to note that the problems presented in internal centerless grinding with which the present invention is concerned, are quite different from those of external centerless grinding.

In external grinding problems, a very large wheel mounted on a heavy spindle may be used so that spindle deflection and wheel wear problems are not acute. The work is supported on the same surface which is being ground, or at least another external surface and the means for locating and rotating the work can be arranged quite differently with relation to the wheel than is the case in internal grinding and such arrangements are at least unsatisfactory and usually useless in connection with internal grinding.

In internal grinding, since the grinding wheel or tool must be introduced inside of a comparatively small bore, the wheel is much smaller than an external type wheel and in order to reach into the work it must be mounted on a comparatively long and thin spindle. Therefore, spindle deflection problems arise causing inaccuracies in the work, particularly if the work locating and support means prevent reduction of spindle length to a minimum. The present invention is concerned, therefore, not only with means for locating work by its external surfaces while finishing an internal surface, but also with the means in combination therewith for rotating the work and for holding it against the locating means and at the same time allowing application of an internal finishing tool which has as short a spindle as possible.

In the drawings:

Fig. 2 is a view similar to Fig. 1 with some of the parts broken away and others in section.

Fig. 3 is a right end elevation of the work support arrangement.

Fig. 5 is a section on line 5—5 of Figs. 2 and 9.

Figure 1:
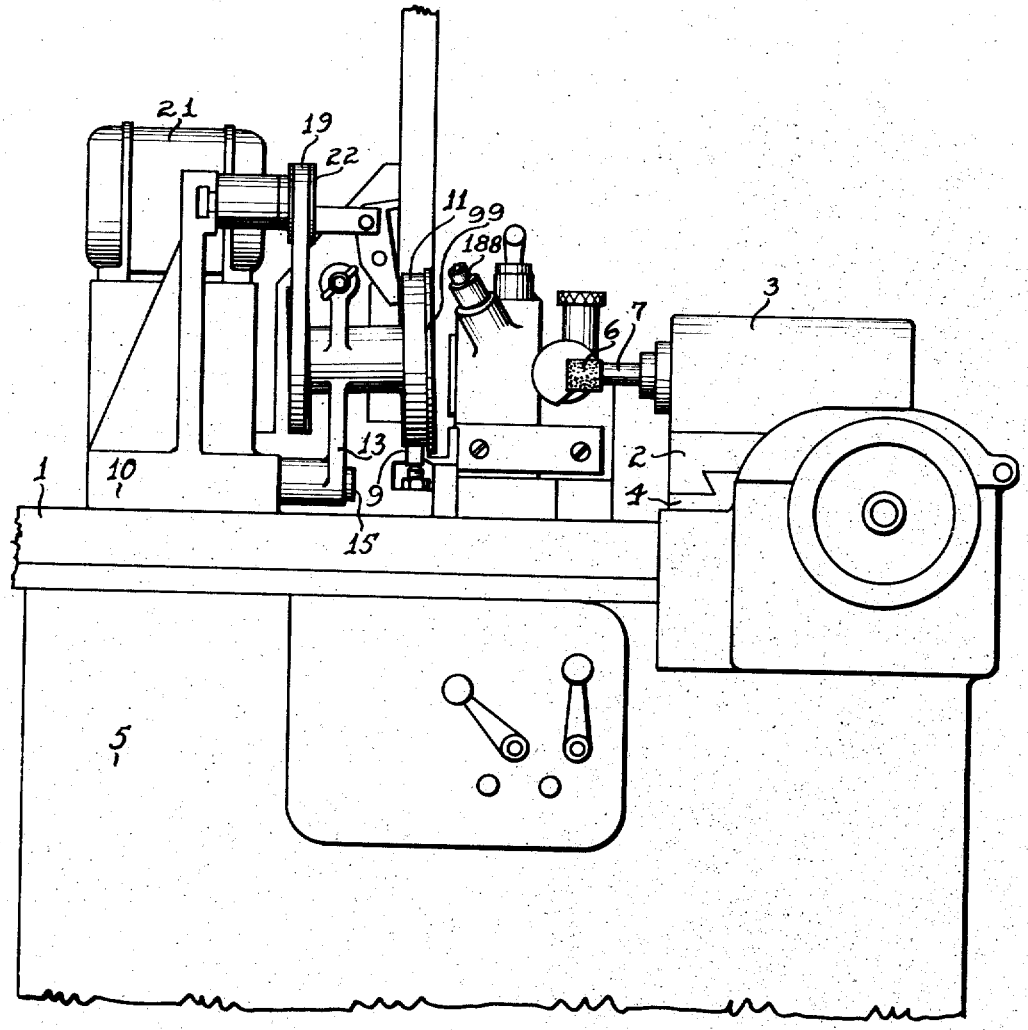
Fig. 1 is a partial front elevation of a machine of the invention.

Referring to Figs. 1 and 2, the machine includes a table 1, arranged to reciprocate on a base 5 to which is fastened a bridge 4. A grinding tool 6 is carried on a spindle 7, the designation grinding tool or wheel being used herein to cover the usual internal grinding wheel comprising bonded abrasive material or the more recent metal tools *such as burrs, that is, cylinders of tungsten carbide or other hard material having fine cutting teeth thereon* which are adapted to serve the same function of finishing an internal surface to close tolerances. The spindle 7 is journaled in a wheelhead 3 on the bridge. A dressing or truing tool is indicated at 188. The wheelhead 3 is mounted on a slide 2 which slides on ways on the bridge 4 to provide transverse or cross feed of the wheel 6.

Figure 18:
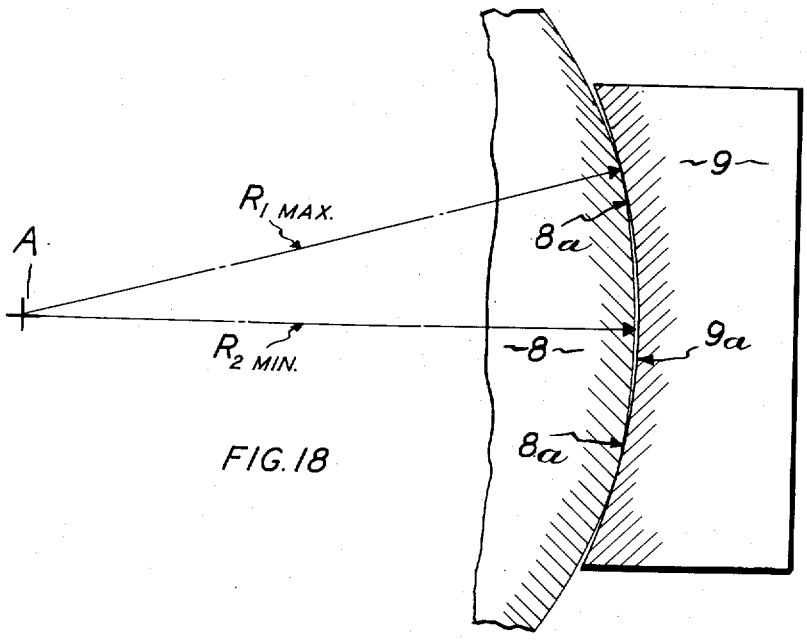
*Fig. 18 is an enlarged and exaggerated partial end view of a workpiece seated against a support shoe.*

Referring also to Fig. 3, an annular workpiece 8 rests on a work support 9, which is adjustably mounted on a body 10 carried by the table 1. The support 9 has a concave support surface 9a, preferably faced with tungsten carbide or other wear-resisting material, which substantially conforms with the preformed periphery of the work and extends circumferentially in contact with the periphery sufficiently to bridge irregularities therein and to fix the center of rotation of the work. *Fig. 18 shows the irregularities 8a exaggerated on the periphery of the workpiece 8, and how the shoe surface 9a bridges across them. Such irregularities, for instance those produced by a comparatively rough machining operation as compared to a finishing operation on the workpiece periphery result mostly from tool chatter and average about equal in height and depth between a maximum workpiece radius $R_1$ and a minimum workpiece radius $R_2$. It is seen that since the support surface 9a rides tangentially across the peaks of the irregularities, no movement of the work results such as occurs when the work is supported by a blade or roll type support which produces a line contact with the work causing the workpiece to move on its support as the line contact rides up and down over the irregularities.* The support 9 is shown relieved to insure contact with the work near the ends of the support. In many applications a continuous support is satisfactory particularly where uniformity of outside workpiece diameters is to be expected, but it is preferable to divide the work support 9 as shown because an undersized workpiece has a tendency to rock in a support having a continuous surface whereas a divided surface provides a saddle which serves to maintain in fixed radial position successive workpieces which vary slightly in outside diameter. This invention, however, covers the use of both continuous and divided concave workpiece support surfaces. *By further reference to Figure 18 it will be seen that the support surface 9a is concave circumferentially of and in a plane normal to an axis A. Since the support surface may, for certain purposes, not always be circular as shown, it may have more than one axis. Such multiple axes as well as the axis A may, for practical purposes, be designated as the average axis of the support surface.*

The workpiece 8 is rotated in the support 9 by rolls 11 and 12 which engage the periphery of the work. The rolls 11 and 12 are journaled in arms 13 and 14 fulcrumed on studs 15 and 16 in the body 10 and are driven by sheaves 17 and 18 which are connected to the rolls by shafts, not shown, running through the arms 13 and 14. A belt 19 driven by a sheave 20 on a drive motor 21 passes over an idler 22 and around the sheaves 17 and 18 to drive them. The sheaves 18 may be made slightly smaller than the sheaves 17, the difference being exaggerated in the drawings, so that the surface of the roll 12 moves downward in contact with the work 8 at a higher speed than the surface of the roll 11 moves upward in contact with the work, tending to hold the work down in contact with the support 9. The rolls 11 and 12 may be journalled, as shown, slightly above the center of the work to aid in holding it down.

Tension in the belt 19 tends to swing the rolls 11 and 12 so that they each exert a force on the work, these opposite forces being substantially equal since the difference between the diameters of the sheaves 17 and 18 is slight and may be compensated for by suitable arrangement of the angles formed by the belt 19. Additional forces between the rolls 11 and 12 and the work 8 are provided by a spring 23 which pulls on the arms 13 and 14 with equal force. This balancing of pressures is important to prevent the work from being pushed away from the position in which it is located by the support 9.

Figure 4:
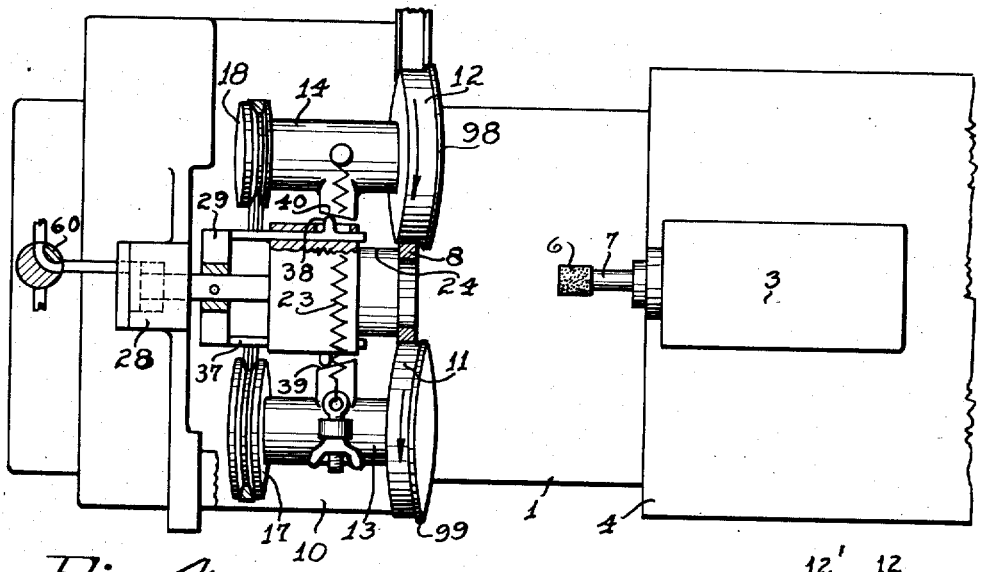
Fig. 4 is a plan view of the work support arrangement.

The rolls 11 and 12 are skewed, as best shown in Fig. 4 so that when rotated in the direction indicated by the arrows they hold the work 8 against a cup shaped back plate 24 as well as holding it down in the support 9. This is due to the fact that when the rolls are skewed and rotated as shown, they exert a component of force on the workpiece which is axial and toward the back plate, as well as a rotative force. Flanges 98 and 99 on the rolls are clear of the work in this position, being provided to facilitate loading, as will be shown.

The backplate 24 is located axially, but not radially, by a conventional flat-plate ball thrust bearing 54 in the body 10[. The backplate 24 is not journaled in the body 10, but] *and* its weight is taken by pins 55, Fig. 5, which are urged toward the center by light springs 56 and engage a surface 57 on one of the races of the bearing 54 mounted on the backplate 24, thereby supporting the backplate 24 in a substantially concentric relation to the bore of the body 10 when no work is present. When a workpiece 8 is pressed against the backplate 24 and rotated, the work drives the plate by friction, the plate turning on an axis determined by the work and compressing the springs 56 as necessary.

The backplate 24 accurately fixes the plane of the end surface of work held against it. The support 9 is shown relatively short in an axial direction so that it will not interfere with the fixing of the plane of the end surface by the backplate.

With this combination of support and backplate and its arrangement with respect to the wheel 6, the inner surface of a workpiece may be ground on an axis precisely at right angles to an end surface and concentric with the periphery in at least one plane, and a succession of workpieces having slightly different outer diameters may be ground to substantially the same inner diameter.

Finished work may be ejected by an ejector plate 25 pushed by any desired means such as a piston rod 26 and piston 27 in a cylinder 28 when a valve 60, Fig. 4, is turned manually, or by any desired means, to admit fluid pressure to the left end of the cylinder 28. As the rod 26 moves to the right, Fig. 2, it carries a member 29, which, through a link 30, rocks an escapement lever 31 in a clockwise direction so that an arm 32 blocks the fall of a workpiece 33 in magazine 34 and an arm 35 releases a workpiece 36, which drops into the support 9 when the finished workpiece 8 is ejected. The member 29 is provided with arms 37 and 38, Fig. 4, which when moved to the right, coact with inc'ined surfaces 39 and 40 on the levers 13 and 14 to push these levers apart, swinging the rolls 11 and 12 away from the workpiece to permit ejection thereof.

Figure 8:
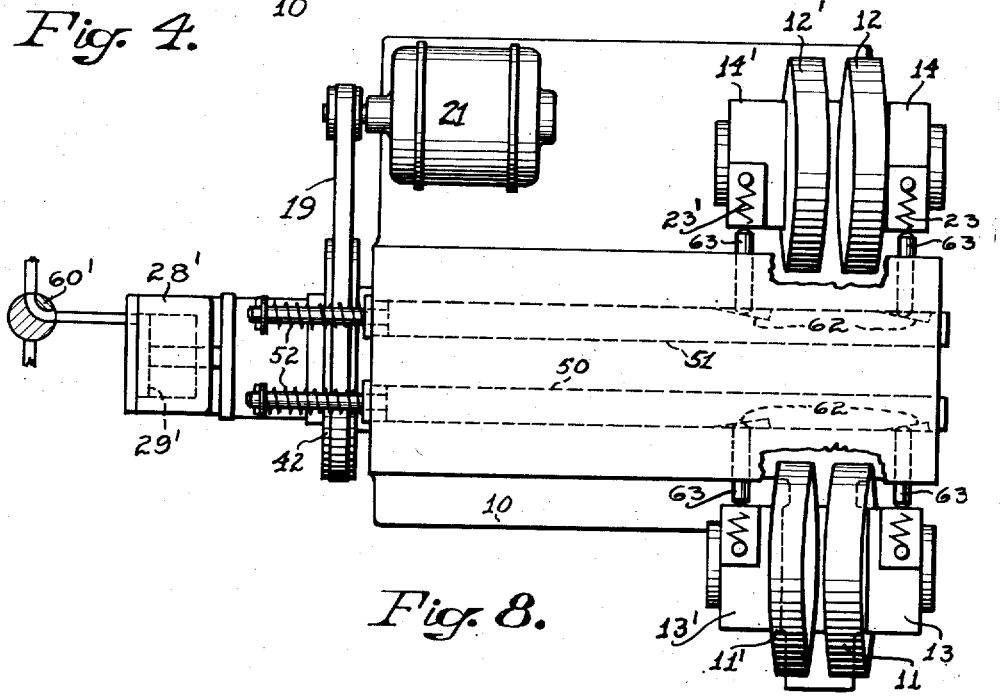
Fig. 8 is a plan view of Figs. 6 and 7.
Figure 6:
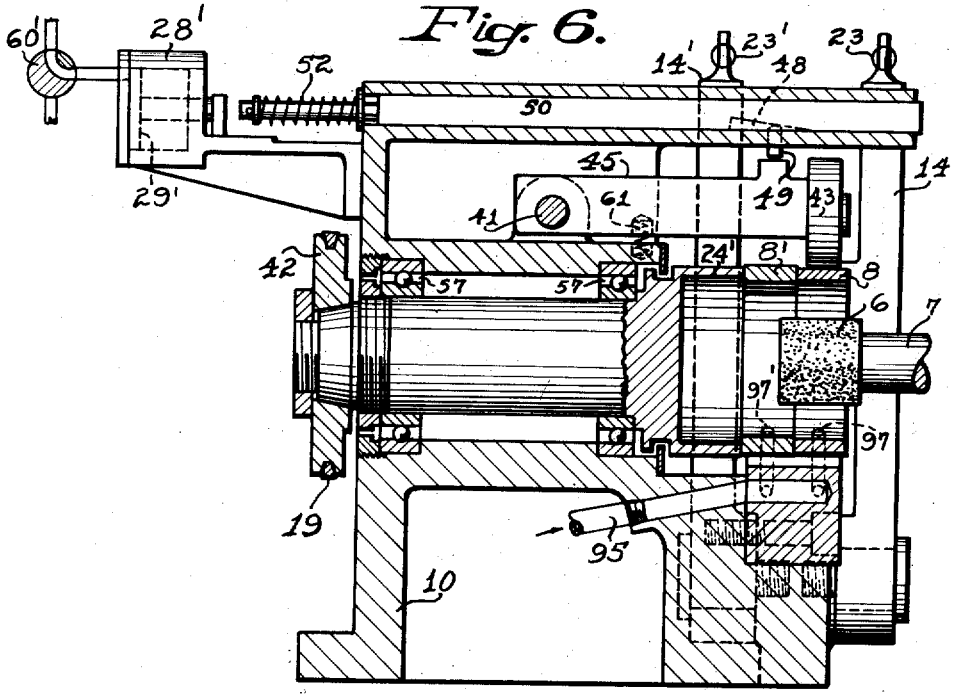
Fig. 6 is a section of a modification of the work support means taken on line 6—6 of Fig. 7.
Figure 7:
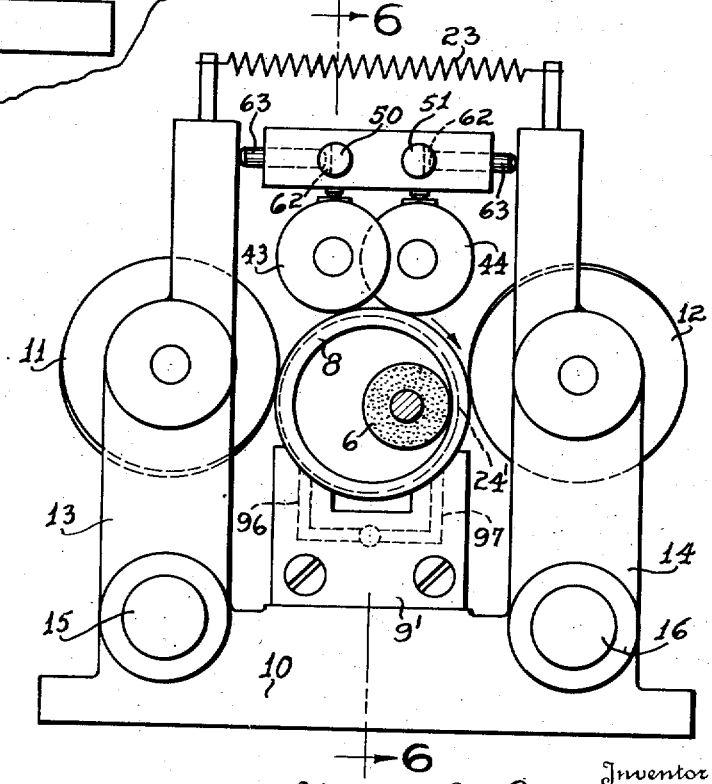
Fig. 7 is a right end view of Fig. 6.

The principles of the support arrangement which has been described may be utilized in grinding two or more workpieces simultaneously to the same inner diameter, since manufacturing tolerances on the outer diameter move the center of the work at right angles to the direction of feed and so have negligible effect on the inner diameter. Such an arrangement is shown in Figs. 6, 7 and 8.

In this embodiment two workpieces 8 and 8' are shown resting in a support 9' against a backplate 24'. In this case the support 9' is axially long enough to seat more than one workpiece. Skewed rolls 11 and 12 carried in levers 13 and 14 are urged against the work 8 by a spring 23, and rolls 11' and 12' carried in similar levers 13' and 14' are urged against the work 8' by a spring 23'. These rolls have the same effect as previously described in holding the workpieces down against the support 9' and also against the backplate 24'.

Holes as shown at 96, 97 and 97' may be provided in each work locating surface of the support 9' and connected to a supply line 95. Air or other fluid may be introduced under pressure through the line 95 to reduce the contact pressure between the work 8 and 8' and the support 9', lowering the friction which might otherwise prevent the work from rotating freely in the support.

The work may be rotated either by the rolls which are driven as shown in Figs. 1–4, or by the backplate. In order that both embodiments may be illustrated, a backplate 24' is shown in Fig. 6 carrying a sheave 42 driven by a belt 19 and motor 21, Fig. 8. The backplate 24' is mounted on anti-friction bearings 57 in the body 10. If desired, but not essentially, center of the backplate 24' may be located slightly to the left of the center of the work in Fig. 7. This eccentric mounting also tends to hold the work down in the support 9' when the backplate 24' and work 8 rotate in the direction of the arrow. However, because the rolls are usually sufficient to hold the work down on the support, it is ordinarily preferable to mount the backplate concentrically with the work in order that there be no sliding between them, the friction of rest allowing the backplate to exert greater rotative force on the work when the backplate is used to drive the work.

Rolls 43 and 44 are arranged to bear each on one of the workpieces 8 and 8' near the top of the work, so that the wheel 6 may be fed against the work with great force without lifting the work out of the support 9'. Rolls 43 and 44 are each carried on a lever 45, one of which is behind the other in Fig. 6. The levers 45 are pivoted at 41 and each carries a pin 49 contacting a cam or wedge surface 48 on one of the sliding bars 50 and 51 which are urged by springs 52 toward the left, causing the rolls 43 and 44 to be held against the workpieces 8 and 8'.

The springs 52 may be comparatively light, their function being to move the cam surfaces 48 into position to resist upward movement of the work and rolls 43 and 44 without creating excessive friction between the work and support 9. The angle of the cam or wedge surfaces 48 may be so chosen that when rolls 43 and 44 move downward they will exert a force much smaller than that required to move them upward, in fact, these cam or wedge surfaces may be made irreversible. It will be seen that similar results may be obtained with any type of cam surface including screw threads.

For loading, fluid pressure may be admitted to the left end of a cylinder 28' by a manually operated valve 60' pushing a piston assembly 29' to the right. The piston assembly 29' pushes the bars 50 and 51 to the right compressing the springs 52 and moving the cam surfaces 48 away from the pins 49, allowing the levers 45 to be raised by the springs 61, lifting the rolls 43 and 44 clear of the work.

On each bar 50 and 51 are two inclined surfaces 62 which, when the bars are pushed toward the right as viewed in Fig. 6, push pins 63 against arms 13, 13', 14 and 14', moving the rolls 11, 11', 12 and 12' away from the work. The finished work may now be removed manually and replaced by unfinished work. Rotating the backplate 24' will rotate the workpiece 8' pressed against it and workpiece 8' will rotate the workpiece 8. The rotation of the work will rotate the skewed rolls 11, 11', 12 and 12' which engage the work and the rotation of these rolls forces the work against the backplate.

Figure 10:
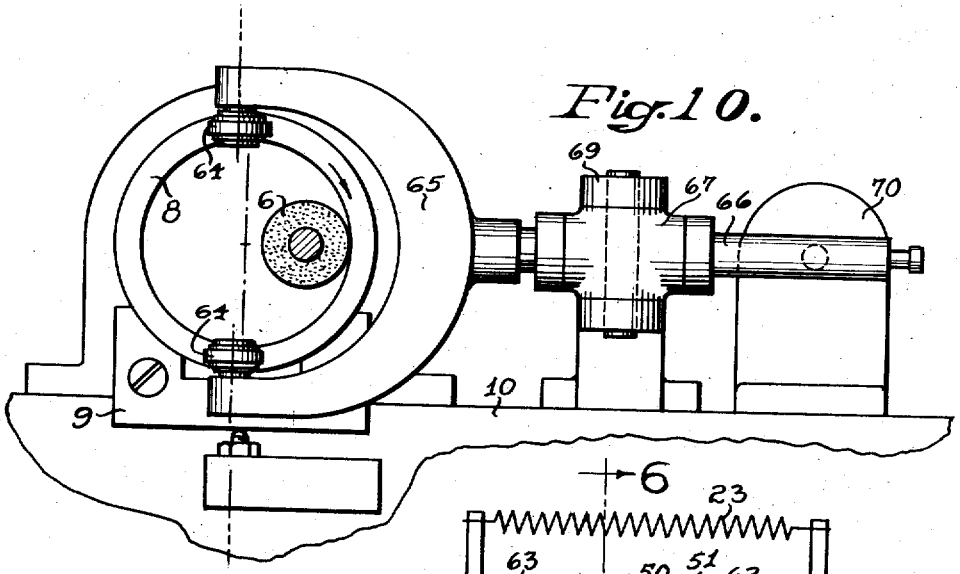
Fig. 10 is a partial right-end view of the embodiment shown in Fig. 9.
Figure 9:
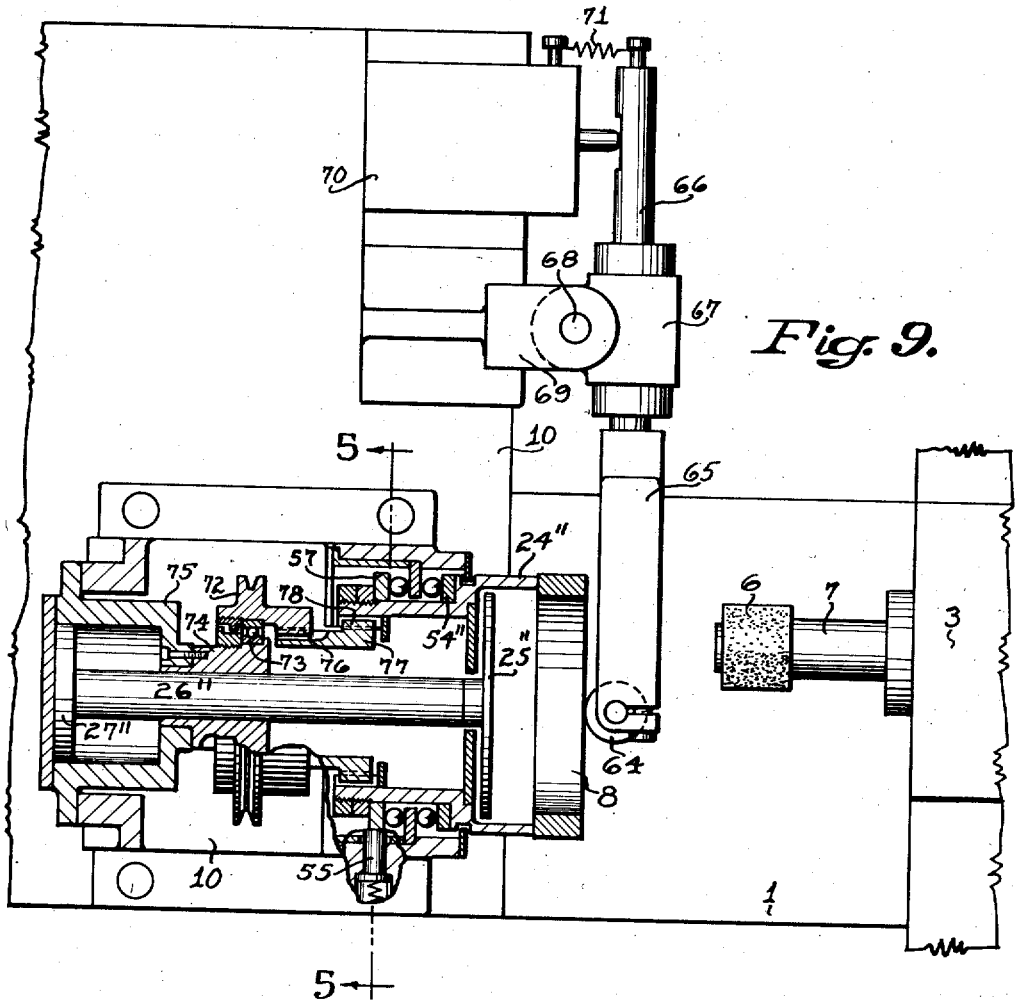
Fig. 9 shows another modification viewed in section.

In another embodiment of this invention, illustrated in Figs. 9 and 10, the work 8 may be held against a driven backplate 24'' by two rolls 64 which engage an end surface of the work. The axes of the rolls 64 are offset from the axis of the work. If this offset is toward the left, as shown in Fig. 10, and the work is rotated by the backplate in the direction of the arrow, the action of rolls 64 is to force the work downward against the support 9. This comes about because the motion of the end surface of the work at its line of contact with each of the rolls 64 has a small upward component, that is, the work must slide upwardly across each roll, since the surface of the roll moves horizontally, and this sliding produces a downward force on the work.

The rolls 64 are carried by a yoke 65 on a bar 66 fastened in a block 67 fulcrumed at 68 in a bracket 69 attached to the body 10. The bar 66 may be swung by pressure means, such as a fluid cylinder 70, to force the rolls 64 against work 8. A spring 71 swings the bar 66 to separate the rolls 64 from the work when pressure is released from the cylinder 70 to permit loading.

The backplate 24'' is mounted as shown in Fig. 2 being located axially, but not radially, by a flatplate ball thrust bearing 54''. The weight of the backplate 24'' is taken on spring pressed pins 55 as shown in Figs. 2 and 5 engaging a surface 57 on a race of the bearing 54'' and holding the backplate substantially concentric with the support 9'', except when moved away from this location by the work.

The backplate 24'' is shown in Fig. 9 driven by a sheave 72 which rotates on a ball bearing 73 carried on a bushing 74 on a cylinder 75 mounted on the body 10. The sheave 72 is rotated through a belt and a motor not shown, and has internal *splines* [gear teeth] 76 which drive one end of a floating gear 77, the other end of which drives the backplate 24'' by internal *splines* [gear teeth] 78 therein.

This construction allows the backplate 24'' to drive work held against it, without tending to move the work away from its center of rotation as fixed by the support 9''. Since there is no sliding between the work and the plate, the coefficient of friction is high and wear is minimized.

When the rolls 64 are swung away from the work, as has been described, the work may be ejected conveniently by applying fluid pressure to the left end of the cylinder 75 pushing a piston 27'', rod 26'', ejector plate 25'' and work 8 toward the right.

Figure 11:
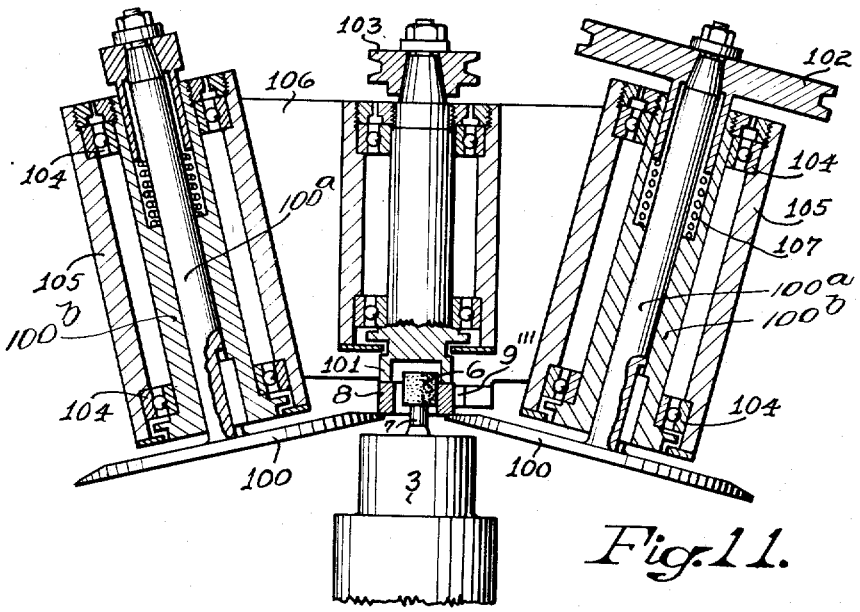
Fig. 11 is a plan view in section of a further modification.
Figure 12:
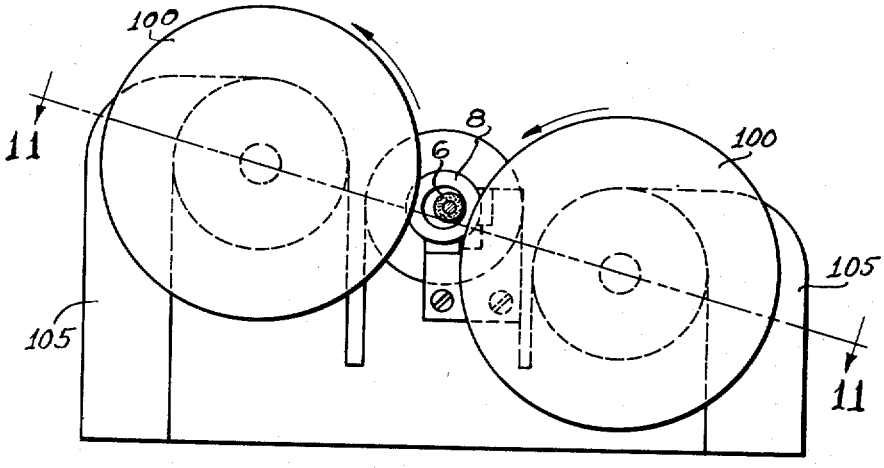
Fig. 12 is an end view of Fig. 11.

In another embodiment, shown in Figs. 11 and 12, rolls or discs 100 are provided to engage an end surface of the work 8 and to force the work against a revolving backplate 101. *With* [By making] the rolls 100 *made* comparatively thin [discs] and [by placing] *with* their axes at an acute angle to the axis of the backplate, as shown, or parallel to the axis of the backplate, it is possible for the wheelhead 3 to approach the work 8 closely, minimizing the length of the overhung portion of the wheel spindle 7.

The support shoe 9''' may be located as desired, but it is shown so located as to provide support for the work directly in line with the direction of feed.

One of the rolls 100 may be driven by a belt on a sheave 102 in a direction to urge the work against the support 9''' or the backplate 101 may be driven by a belt on a sheave 103, or both driving means may be used.

Each of the rolls 100 has a stem 100a slidably mounted in a sleeve 100b which is journalled in bearings 104 in a housing 105. A spring 107 in each sleeve 100b pushes against the hubs of sheave 102 and sleeve 100b, urging the rolls 100 against the work. Housings 105 are connected by a plate 106.

Figure 14:
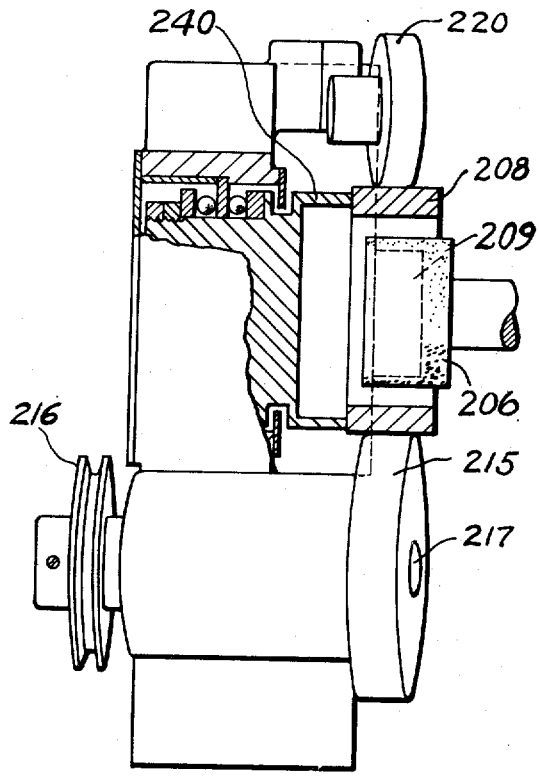
Fig. 14 is a side view of Fig. 13 partly broken away and in section.
Figure 13:
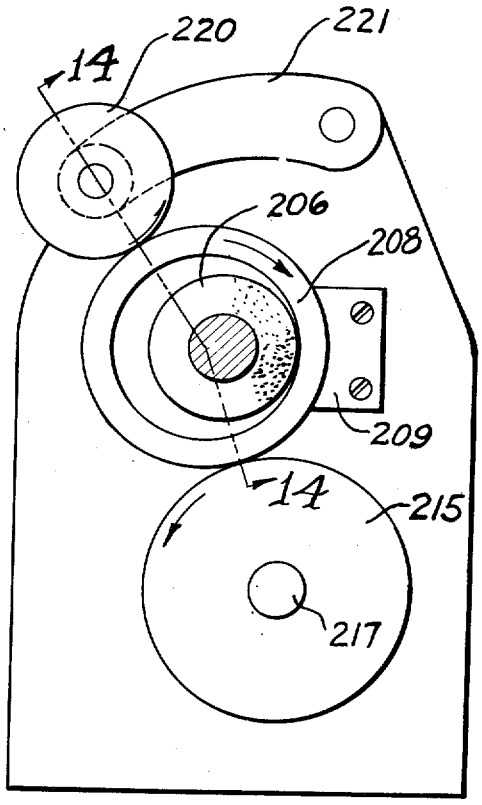
Fig. 13 is an end view of another modification.

Another modification is shown in Figs. 13 and 14 in which the work is located radially both by a fixed concave support 209 and by a radially fixed but rotatable solid slow roll 215 on a shaft 217 which may be driven as by a pulley 216 on the opposite end of the shaft 217. The work 208 is urged against the fixed support 209 and the roll 215 by a pressure roll 220 on a spring urged arm 221. The fixed support 209 is located to support the work in line with pressure from the grinding tool 206. The work 208 is supported axially by a backplate 240 similar to others herein described. Either or both of the rolls 215 and 220 may be skewed to force the work against the backplate 240. A driven backplate may be substituted for drive means for the roll 215 in order to drive the work 208.

Figure 17:
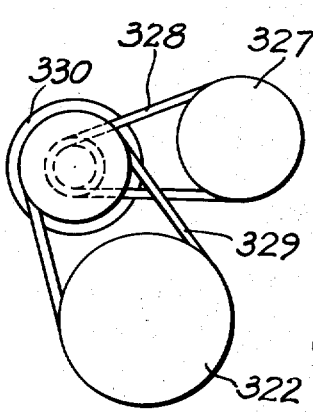
Fig. 17 is an end view of driving means for the modification of Fig. 16.
Figure 16:
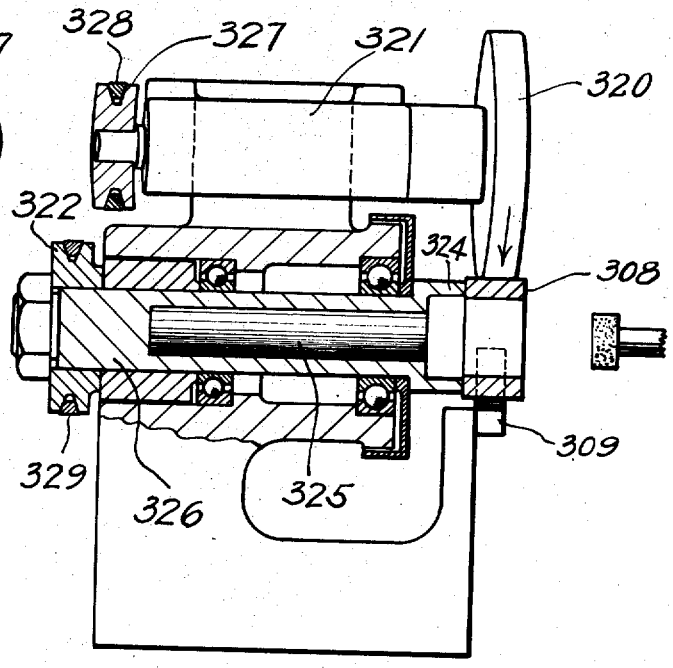
Fig. 16 is a side view of Fig. 15 partly in section.
Figure 15:
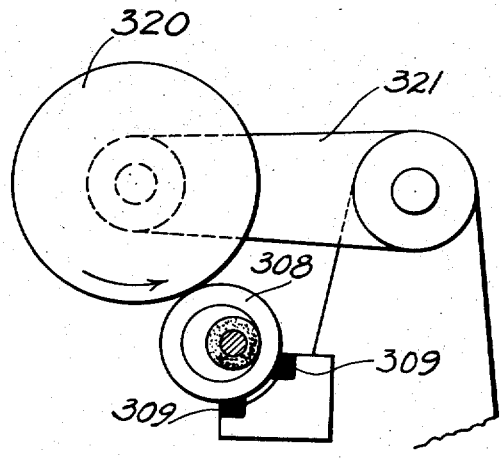
Fig. 15 is an end view of a further modification.

A still further modification of the invention is shown in Figs. 15–17 in which a workpiece 308 is held by a pressure roll 320 which may be skewed, mounted on a spring arm 321, against a fixed concave work support 309 of the type previously described herein. The workpiece 308 abuts against a backplate 324. A permanent magnet 325 is mounted in the backplate spindle 326. The fixed support 309 is comprised of non-magnetic material such as boron carbide. The workpiece 308 may be driven either by the pressure roll 320 or by the backplate 324 or by both, as illustrated, through pulleys 322, 327 and belts 328, 329 connected respectively to a drive motor 330, as seen in Fig. 17. The magnet 325 establishes a magnetic circuit including the backplate 324, the workpiece 308 and the pressure roll 320 thus increasing the friction between the workpiece and the parts which drive it, and improving the characteristics of the means for driving the workpiece 308.

*It will be seen that the backplate provides end stop means which in all cases has work engaging elements circularly arranged around and in a plane which is substantially normal to the average axis A of the support shoe, and that in the case of an eccentric backplate, these support elements are concentric to the backplate spindle axis and slightly eccentric to the average axis of the support surface. It will also be seen that while the work engaging elements comprising the face of the end stop means are arranged to abut the end of a workpiece and hence to fix its endwise position, the contact with the work is solely in a plane substantially normal to the average axis and therefore the end stop means does not exert a centering action on the workpiece but allows the workpiece to be supported radially solely by the support shoe or shoes.*

I claim:

[1. In an internal grinding machine for refining an inner surface of revolution of a workpiece, said workpiece having an outer preformed surface of revolution, and in combination, means to rotate the workpiece, fixed work support means having an arcuate concave surface generally conforming with said outer preformed surface and extending circumferentially in contact therewith sufficiently to bridge irregularities thereon and to position the rotating workpiece radially, a grinding tool applicable to said workpiece to refine said inner surface, rotating end stop means abutting the workpiece preventing its axial movement in one direction, and pressure means independent of said end stop means engageable against and located by the workpiece to hold it against said support means and against said end stop means.]

[2. In an internal grinding machine for refining an inner surface of revolution of a workpiece, said workpiece having an outer preformed surface of revolution, and in combination, fixed work support means having an arcuate concave surface generally conforming with said outer preformed surface and extending circumferentially in contact therewith sufficient to position the workpiece radially, a grinding tool applicable internally of said workpiece to refine said inner surface, rotating end stop means abutting the workpiece preventing its axial movement in one direction, yieldably mounted roll means engageable against said outer surface holding the workpiece against said support means, means to urge the workpiece against said end stop means, and means to rotate the workpiece in said support means.]

[3. In an internal grinding machine for refining an inner surface of revolution of a workpiece, said workpiece having an outer preformed surface of revolution, and in combination, fixed work support means having an arcuate concave surface generally conforming with said outer preformed surface and extending circumferentially in contact therewith sufficiently to position the workpiece radially, a grinding tool applicable internally of said workpiece to refine said inner surface, rotating end stop means abutting the workpiece preventing its axial movement in one direction, yieldably mounted roll means engageable against said outer surface holding the workpiece against said support means, means to urge the workpiece against said end stop means, means to rotate the workpiece in said support means, and means to retract the roll means from the workpiece after completion of a finished workpiece.]

[4. In an internal grinding machine for refining an inner surface of revolution of a workpiece, said workpiece having an outer preformed surface of revolution, and in combination, fixed work support means having an arcuate concave surface generally conforming with said outer preformed surface and with which said outer preformed surface is engageable, said support means extending circumferentially in contact with said outer surface sufficiently to position said workpiece radially, a grinding tool applicable internally to said workpiece to refine said inner surface, rotating end stop and workpiece drive means abutting the workpiece preventing its axial movement in one direction, roll means engageable against said outer surface holding the workpiece against said support means, and means urging the workpiece against said drive means thereby rotating the workpiece in said support means.]

[5. In an internal grinding machine, for generating an inner surface of revolution of a workpiece, said workpiece having an outer preformed surface of revolution, and in combination, fixed work support means having an arcuate concave surface generally conforming with said outer preformed surface and with which said outer preformed surface is engageable, a grinding tool applicable internally of said workpiece to generate said inner surface, end stop means abutting the workpiece preventing its axial movement in one direction, a pair of skewed rolls engageable against said outer surface holding the workpiece against said support means and said end stop means, means to rotate the workpiece in said support means and means to separate the rolls after completion of a finished workpiece.]

[6. In an internal grinding machine for generating an inner surface of revolution of a workpiece, said workpiece having an outer preformed surface of revolution, and in combination, fixed work support means having an arcuate concave surface generally conforming with said outer preformed surface and with which said outer preformed surface is engageable, a grinding tool applicable internally of said workpiece to generate said inner surface, end stop means abutting the workpiece preventing its axial movement in one direction, a pair of skewed rolls engageable against said outer surface holding the workpiece against said support means and said end stop means, means to rotate the workpiece in said support means and means to separate the rolls after completion of a finished workpiece and then to eject finished workpieces.]

[7. In an internal grinding machine for generating an inner surface of revolution of a workpiece, said workpiece having an outer preformed surface of revolution, and in combination, fixed work support means having an arcuate concave surface generally conforming with said outer preformed surface and with which said outer preformed surface is engageable, a grinding tool applicable internally of said workpiece to generate said inner surface, end stop means abutting the workpiece preventing its axial movement in one direction, a pair of skewed rolls engageable against said outer surface holding the workpiece against said support means and end stop means, and means to rotate at least one of said skewed rolls thereby rotating the workpiece in said support means.]

[8. In an internal grinding machine for generating an inner surface of revolution of a workpiece, said workpiece having an outer preformed surface of revolution, and in combination, fixed work support means having an arcuate concave surface generally conforming with said outer preformed surface and with which said outer preformed surface is engageable, a grinding tool applicable internally of said workpiece to generate said inner surface, a rotatable end stop abutting the workpiece preventing its axial movement in one direction, a pair of skewed rolls engageable against said outer surface holding the workpiece against said support and end stop means, and means to drive said end stop thereby rotating said workpiece in said support.]

[9. In an internal grinding machine for refining an inner surface of revolution of a workpiece, said workpiece having an outer preformed surface of revolution, and in combination, fixed work support means having an arcuate concave surface generally conforming with said outer preformed surface and extending circumferentially in contact therewith sufficiently to bridge irregularities thereon and to position the rotating workpiece radially, a grinding tool applicable to said workpiece to refine said inner surface, a backplate abutting the workpiece and adapted to fix the plane of its end surface, means to hold the workpiece against said backplate, a pair of rolls engageable against said outer surface, and means to rotate said rolls one at a different peripheral speed than that of the other, said rolls thereby driving said workpiece and urging it against said support means.]

[10. In an internal grinding machine for refining an inner surface of revolution of a workpiece, said workpiece having an outer preformed surface of revolution, and in combination, means to rotate the workpiece, fixed work support means having an arcuate concave surface generally conforming with said outer preformed surface and extending circumferentially in contact therewith sufficiently to bridge irregularities thereon and to position the rotating workpiece radially, a grinding tool applicable to said workpiece to refine said inner surface, rotating end stop means abutting the workpiece preventing its axial movement in one direction and a pair of skewed rolls engageable against said outer surface holding the workpiece against said support means and end stop means, said rolls being urged together and against the workpiece by balanced pressure means.]

[11. In an internal grinding machine for generating an inner surface of revolution of a workpiece, said workpiece having an outer preformed surface of revolution, and in combination, fixed work support means having an arcuate concave surface conforming with said outer preformed surface and with which said outer preformed surface is engageable, a grinding tool applicable internally of said workpieces to generate said inner surface, a platen abutting the workpiece adapted to fix the plane of rotation thereof, roll means engageable against said outer surface holding the workpiece against said support means, non-reversible means urging said roll means against said workpiece and preventing movement of the roll means away from said support means, means to urge the workpiece against said platen, and means to rotate the workpiece in said support means.]

[12. In an internal grinding machine for generating an inner surface of revolution of a workpiece, said workpiece having an outer preformed surface of revolution, and in combination, fixed work support means with which said outer preformed surface is engageable, a grinding tool applicable internally of said workpieces to generate said inner surface, a platen abutting the workpiece adapted to fix the plane of rotation thereof, roll means engageable against said outer surface holding the workpiece against said support means, non-reversible means urging said roll means against said workpiece and preventing movement of the roll means away from said support means, means to urge the workpiece against said platen, means to rotate the workpiece in said support means, and means to withdraw the roll means after operation of the tool to permit replacement of a finished workpiece.]

[13. In an internal grinding machine for generating inner surfaces of revolution having the same diameter in a plurality of workpieces having outer preformed surfaces of revolution of different diameters, and in combination, a grinding tool applicable internally of said workpieces, fixed work support means having an arcuate concave surface approximately conforming with said outer preformed surfaces and with which a plurality of said outer preformed surfaces are engageable, said support means being adapted to locate said plurality of workpieces radially with their centers of revolution substantially equidistant from the line of contact of said wheel, end stop means abutting one of a plurality of adjacent workpieces preventing their axial movement in one direction, roll means engageable against each of said outer surfaces holding the workpieces against said support, irreversible friction means urging said roll means against each said workpiece and preventing movement of the roll means away from said support, means to urge the workpieces against the end stop means, and means to rotate the workpieces in said support means.]

[14. In an internal grinding machine for generating inner surfaces of revolution having the same diameter in a plurality of workpieces having outer preformed surfaces of revolution of different diameters, and in combination, a grinding tool applicable internally of said workpieces, fixed work support means with which a plurality of said outer preformed surfaces are engageable, said support means being adapted to locate said plurality of workpieces radially with their centers of revolution substantially equidistant from the line of contact of said wheel, end stop means abutting one of a plurality of adjacent workpieces preventing their axial movement in one direction, roll means engageable against each of said outer surfaces holding the workpieces against said support, irreversible friction means urging said roll means against each said workpiece and preventing movement of the roll means away from said support, means to urge the workpieces against the end stop means, means to rotate the workpieces in said support means, and means to withdraw the roll means after operation of the wheel to permit replacement of finished workpieces.]

[15. In an internal grinding machine for generating an inner surface of revolution of a workpiece, said workpiece having an outer preformed surface of revolution and an end surface, and in combination, fixed work support means having an arcuate concave surface generally conforming with said outer preformed surface and extending circumferentially in contact therewith sufficiently to bridge irregularities thereon, said support means thereby fixing the rotating workpiece radially, a grinding tool applicable to said workpiece to generate said inner surface, rotatable end stop means abutting the workpiece preventing its axial movement in one direction, means to rotate the end stop means and thereby the workpiece, and pressure means having roll means engaging an end surface of said workpiece and holding it in frictional engagement with said end stop means, the axis of revolution of said roll means being displaced from the axis of revolution of said workpiece, said pressure means thereby also urging said workpiece against said support.]

[16. In an internal grinding machine for refining an inner surface of revolution in a workpiece having a preformed outer surface of revolution, and in combination, a rotary tool applicable to said inner surface, a rotating platen adapted to fix the plane of an end surface of a workpiece in frictional contact with said platen and to drive said workpiece, support means having a stationary arcuate surface extending circumferentially in contact with said outer surface sufficiently to fix the location of the workpiece in the plane of said platen, and roll means engageable with an end surface of the workpiece to hold it against said platen, the axis of revolution of said roll means being displaced from the axis of revolution of said workpiece, whereby the workpiece is urged against said support.]

[17. In an internal grinding machine for refining an inner surface of revolution of a workpiece, said workpiece having an outer preformed surface of revolution, and in combination, means to rotate the workpiece, fixed work support means having an arcuate concave surface generally conforming with said outer preformed surface and extending circumferentially in contact therewith sufficiently to bridge irregularities thereon and to position the rotating workpiece radially, a grinding tool applicable to said workpiece to refine said inner surface, a rotary backplate mounted with sufficient radial play to allow it to be positioned radially by said workpiece, said backplate being adapted to position said workpiece axially and angularly, and pressure means independent of said backplate adapted to engage and to follow said workpiece, holding it against said support means and against said backplate.]

[18. In an internal grinding machine for generating an inner surface of revolution of a workpiece, said workpiece having an outer preformed surface of revolution and an end surface, and in combination, fixed work support means having an arcuate concave surface generally conforming with said outer preformed surface and extending circumferentially in contact therewith sufficiently to bridge irregularities thereon, said support means thereby fixing the rotating workpiece radially, a grinding tool applicable to said workpiece to generate said inner surface, rotatable end stop means abutting the workpiece preventing its axial movement in one direction, means to rotate the end stop means and thereby the workpiece, and roll means engaging an end surface of said workpiece and holding it in frictional engagement with said end stop means, the axis of revolution of said roll means forming an angle of less than 90° with the axis of said end stop means.]

[19. In an internal grinding machine for generating an inner surface of revolution of a workpiece, said workpiece having an outer preformed surface or revolution and an end surface, and in combination, fixed work support means having an arcuate concave surface generally conforming with said outer preformed surface and extending circumferentially in contact therewith sufficiently to bridge irregularities thereon, said support means thereby fixing the rotating workpiece radially, a grinding tool applicable to said workpiece to generate said inner surface, rotatable end stop means abutting the workpiece preventing its axial movement in one direction, means to rotate the end stop means and thereby the workpiece, and roll means engaging an end surface of said workpiece and holding it in frictional engagement with said end stop means, the axis of revolution of said roll means forming an angle of less than 90° with the axis of said end stop means, and means for rotating said roll means and thereby urging said workpiece against said support means.]

[20. In an internal, grinding machine for generating an inner surface of revolution of a workpiece having a preformed outer surface of revolution and an end surface and in combination, fixed work support means having an arcuate concave surface substantially conforming with said outer surface and extending circumferentially in contact therewith sufficiently to bridge irregularities therein and to fix the center of rotation of said workpiece, a backplate adapted to fix the plane of the end surface of a workpiece abutting said backplate, means for forcing said workpiece against said backplate, means for rotating said workpiece, roll means and positioning means for moving said roll means into contact with said outer surface, said positioning means being adapted to exert only a comparatively light force when said roll means moves toward the workpiece and being adapted to resist with comparatively great force motion of said roll means away from said workpiece, thereby preventing said workpiece from being moved away from said support means by force exerted by said tool.]

[21. In an internal grinding machine for refining an inner surface of revolution of a workpiece, said workpiece having an outer preformed surface of revolution, and in combination, means to rotate the workpiece, fixed work support means having an arcuate concave surface generally conforming with said outer preformed surface and extending circumferentially in contact therewith sufficiently to bridge irregularities thereon and a grinding tool applicable to said workpiece to refine said inner surface, said support surface including a hole through which fluid may be forced to reduce the friction between said workpiece and said support.]

[22. In an internal grinding machine for refining an inner surface of revolution of a workpiece, said workpiece having an outer preformed surface of revolution, and in combination, work support means including a fixed support having an arcuate concave surface generally conforming with said outer preformed surface and extending circumferentially in contact therewith sufficiently to bridge irregularities thereon, said fixed support being comprised of non-magnetic material, rotatable end stop means abutting the workpiece, rotatable pressure roll means engageable against said workpiece to hold it against said support means, means connected to one of said rotatable parts to drive said workpiece and a permanent magnet connected to establish a magnetic circuit in said end stop means and through said wokpiece and pressure roll means thereby increasing the friction between said end stop means, workpiece and pressure roll means.]

*23. In an internal grinding machine for finish grinding the inner surface of a bore in a round workpiece and in combination, a work support including at least one shoe having a surface which is concave generally circumferentially of and in a plane normal to an average axis and arranged to receive and make sliding contact with a circumferential portion of an outer surface of revolution of a workpiece when it is rotated substantially on said axis while bridging irregularities thereon to support said workpiece radially, end stop means spaced from said shoe having work engaging elements circularly arranged around* and in a plane substantially normal to said average axis, said work engaging elements being capable of abutting circumferential portions of one end of a workpiece to fix its endwise position while allowing said workpiece to be supported radially by said shoe, a grinding tool capable of being inserted into the bore of a said workpiece and means to insert said tool within the bore and to move it against its inner surface.

24. The combination as set forth in claim 23, including means to rotate a said workpiece while it is in contact with said shoe and said end stop means.

25. The combination as set forth in claim 23 including pressure means operable to generate a force upon said workpiece in a direction to hold it against said end stop means.

26. The combination as set forth in claim 23 including pressure means operable to generate a force upon said workpiece in a direction to hold it against said shoe.

27. The combination as set forth in claim 23 including pressure means independent of said end stop means engageable against and operable to generate forces upon said workpiece in directions such as to hold it against both said shoe and said end stop means, and means to rotate said workpiece in said position.

28. The combination as set forth in claim 23 including yieldably mounted roll means engageable against said outer surface to hold the workpiece against said shoe, means to urge the workpiece against said end stop means and means to rotate the workpiece.

29. The combination as set forth in claim 28 including means to retract the roll means from the workpiece after completion of a grinding operation.

30. In the combination as set forth in claim 23, said end stop means being rotatable, roll means engageable against said outer surface to hold the workpiece against said shoe, means to urge the workpiece against the end stop means, and means to drive the end stop means to rotate the workpiece.

31. The combination as set forth in claim 23 including a pair of skewed rolls engageable against said outer surface to hold the workpiece against both said shoe and said end stop means and means to separate the rolls after completion of a grinding operation.

32. The combination as set forth in claim 31 including means to eject a finished workpiece after separtion of said rolls.

33. The combination as set forth in claim 31 including means to drive at least one of said skewed rolls to rotate the workpiece.

34. In the combination as set forth in claim 31, said end stop means being rotatable and means to drive said end stop means to rotate the workpiece.

35. The combination as set forth in claim 31 including balanced pressure means to urge said rolls toward each other and against the workpiece.

36. The combination as set forth in claim 23 including means to hold the workpiece against said end stop means, a pair of rolls engageable against said outer surface, and means to drive said rolls one at a different peripheral speed than the other to rotate the workpiece while urging it against the support shoe.

37. The combination as set forth in claim 23 including roll means engageable against said outer surface to hold the workpiece against said shoe, means to urge the roll means against the workpiece, and means to prevent movement of the roll means away from said workpiece during a grinding operation.

38. The combination as set forth in claim 37 including means to withdraw the roll means from the workpiece after completion of a grinding operation to permit replacement of the finished workpiece.

39. The combination as set forth in claim 23, said end stop means including a magnet operative upon a said workpiece in contact with said work engaging face to urge the workpiece against the end stop means.

40. In an internal grinding machine for finish grinding simultaneously the inner surfaces of bores in a plurality of round workpieces and in combination, a work support including at least one shoe having a surface which is concave generally circumferentially of and in a plane normal to an average axis and arranged simultaneously to receive and make sliding contact with circumferential portions of outer surfaces of revolution of a said plurality of workpieces when they are rotated in coaxial abutting relationship substantially on said axis while bridging irregularities thereon to support said workpieces radially, end stop means spaced from said shoe having work engaging elements circularly arranged around and in a plane substantially normal to said average axis, said work engaging elements being capable of abutting circumferential portions of one end of one of said workpieces to fix their endwise position while allowing them to be supported radially by said shoe, a grinding tool having a radius smaller than the average radius of said concave shoe surface and capable of being inserted into the bores of a said plurality of workpieces and means to insert said tool within said bores and against their inner surfaces.

41. The combination as set forth in claim 40 including means to rotate said plurality of workpieces while they are in contact with said shoe and in abutting relation to said end stop means.

42. The combination as set forth in claim 40 including pressure means operable to generate a force upon said workpieces in a direction to urge them toward said end stop means.

43. The combination as set forth in claim 40 including pressure means operable to generate a force upon said workpieces in a direction to urge them toward said shoe.

44. The combination as set forth in claim 40 including roll means engageable against each of said outer surfaces to hold the workpieces against said shoe, and means to urge said roll means against each said outer surface together with means to prevent movement of the roll means away from said workpieces during a grinding operation.

45. The combination as set forth in claim 44 including means to withdraw the roll means after operation of the grinding tool to permit replacement of finished workpieces, 46. In an internal grinding machine for finish grinding an inner surface of a bore in a round workpiece and in combination, a spindle, a work support including at least one shoe having a surface which is concave generally circumferentially of and in a plane normal to the axis of said spindle and arranged to receive and make sliding contact with a circumferential portion of an outer surface of revolution of a workpiece when it is rotated substantially on said axis while bridging irregularities thereon to support said workpiece radially, a backplate mounted to rotate with said spindle having a work engaging face substantially normal to said spindle axis and in spaced relation with said shoe, said work engaging face being capable of abutting one end of a workpiece to fix its endwise position while allowing said workpiece to be supported radially by said shoe, a grinding tool having a radius smaller than the average radius of said concave shoe surface and capable of being inserted into the bore of a said workpiece and means to insert said tool within the bore against its inner surface.

47. The combination as set forth in claim 46 including means to drive the backplate to rotate the workpiece.

48. The combination as set forth in claim 46, said backplate being mounted with its axis of rotation eccentric to the axis of a said radially supported workpiece thereby to make sliding frictional contact with a said workpiece and in a position with respect to said shoe such that a force is exerted by said frictional contact to urge said workpiece against said shoe.

49. The combination as set forth in claim 48 includ-

*ing means to drive the backplate to rotate the workpiece.*

*50. The combination as set forth in claim 46 including a pressure roll positioned to engage an end surface of a workpiece in the shoe to urge it into abutting engagement with said backplate.*

*51. The combination as set forth in claim 50, the axis of revolution of said roll being displaced from the axis of a said workpiece and in a position with respect to said shoe such that a frictional force is exerted by said roll to urge said workpiece also against said shoe.*

*52. The combination as set forth in claim 50, the axis of revolution of said roll forming an angle of less than 90° with the axis of said spindle.*

*53. The combination as set forth in claim 46, means to provide radial play in said spindle to allow it to center itself with the axis of rotation of a said workpiece.*

*54. The combination as set forth in claim 46, said shoe having an internal passage to said concave surface through which fluid may be forced to reduce friction between a workpiece and said shoe.*

*55. The combination as set forth in claim 46, said backplate including a magnet operative upon a said workpiece in contact with said work engaging face to urge the workpiece against the backplate.*

*56. The combination as set forth in claim 46, including means to drive the backplate to rotate the workpiece, said backplate including a magnet operative upon a said workpiece in contact with said work engaging face to urge the workpiece against the backplate.*

*57. The combination as set forth in claim 46, said backplate being mounted with its axis of rotation eccentric to the axis of a said radially supported workpiece thereby to make sliding frictional contact with a said workpiece and in a position with respect to said shoe such that a force is exerted by said frictional contact to urge said workpiece against said shoe, said backplate including a magnet operative upon a said workpiece in contact with said work engaging face to urge the workpiece against the backplate.*

*58. Method of finish grinding the inner surface of a bore in a round workpiece which comprises rotating the workpiece while supporting it radially over a continuous circumferential portion of its outer surface of revolution,*

*non-yieldingly supporting it in an endwise direction without exerting a centering effect and grinding the inner surface of the bore.*

*59. In the method as set forth in claim 58 the step of urging the workpiece against the direction of its said endwise support.*

*60. In the method as set forth in claim 58, the step of urging the workpiece against the direction of its said radial support.*

*61. Method of finish grinding the inner surface of a bore in a round workpiece which comprises rotating the workpiece non-yieldingly supporting it radially over a continuous circumferential portion of its outer surface of revolution while exerting an opposite yielding force against it, non-yieldingly supporting it in an endwise direction without exerting a centering effect while exerting an opposite yielding force against it, and grinding the inner surface of the bore.*

*62. The combination as set forth in claim 23, said work support also including a rotatable roll and means to support said roll on a fixed axis and with the periphery of said roll in circumferential spaced relation to the said concave surface of said shoe thereby to make contact with a said outer surface of a workpiece in contact with said shoe.*

*63. The combination as set forth in claim 62 and means to drive said roll to rotate the workpiece.*

References Cited in the file of this patent or the original patent

UNITED STATES PATENTS

| | | |
|---|---|---|
| 2,027,627 | Blood et al. | Jan. 14, 1936 |
| 2,032,269 | Einstein et al. | Feb. 25, 1936 |
| 2,047,055 | Blood | July 7, 1936 |
| 2,107,051 | Briney | Feb. 1, 1938 |
| 2,171,892 | Richardson | Sept. 5, 1939 |
| 2,243,371 | Blood | May 27, 1941 |
| 2,264,179 | Johnson | Nov. 25, 1941 |
| 2,440,148 | Madison | Apr. 20, 1948 |
| 2,478,562 | Binns | Aug. 9, 1949 |
| 2,478,607 | Theler et al. | Aug. 9, 1949 |
| 2,635,395 | Arms | Apr. 21, 1953 |